United States Patent
Crescenti et al.

(10) Patent No.: US 7,877,351 B2
(45) Date of Patent: Jan. 25, 2011

(54) HIERARCHICAL SYSTEMS AND METHODS FOR PERFORMING DATA STORAGE OPERATIONS

(75) Inventors: John Crescenti, Freehold, NJ (US); Srinivas Kavuri, South Plainfield, NJ (US); David Alan Oshinsky, East Brunswick, NJ (US); Anand Prahlad, East Brunswick, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 408 days.

(21) Appl. No.: 12/109,201

(22) Filed: Apr. 24, 2008

(65) Prior Publication Data

US 2008/0201343 A1   Aug. 21, 2008

Related U.S. Application Data

(63) Continuation of application No. 09/354,058, filed on Jul. 15, 1999, now Pat. No. 7,395,282.

(51) Int. Cl.
*G06F 7/00* (2006.01)
*G06F 17/00* (2006.01)
*G06F 13/00* (2006.01)
*G06F 13/28* (2006.01)
*G06F 15/173* (2006.01)
*G06F 15/16* (2006.01)

(52) U.S. Cl. .............. 707/609; 707/610; 707/638; 707/651; 711/162; 709/226; 709/229

(58) Field of Classification Search .......... 707/609, 707/610, 635, 636, 638, 651, 661, 673, 672, 707/668, 659, 660, 682, 686, 786, 778; 711/112, 711/113, 117, 162; 709/203, 204, 224, 226, 709/229

See application file for complete search history.

(56) References Cited

U.S. PATENT DOCUMENTS 4,686,620 A   8/1987   Ng (Continued)

FOREIGN PATENT DOCUMENTS

EP   0259912   3/1988

(Continued)

OTHER PUBLICATIONS

Odysseas I. Pentakalos, Daniel A. Menasce', Milton Halem, and Yelena Yesha; "Analytical Performance Modeling of Hierarchical Mass Storage Systems"; IEEE; Oct. 1997, vol. 48, No. 10; pp. 1103-1117.*

(Continued)

*Primary Examiner*—Ella Colbert
(74) *Attorney, Agent, or Firm*—Knobbe, Martens, Olson & Bear, LLP (57) ABSTRACT

The invention is a hierarchical backup system. The interconnected network computing devices are put into groups of backup cells. A backup cell has a manager software agent responsible maintaining and initiating a backup regime for the network computing devices in the backup cell. The backups are directed to backup devices within the backup cell. Several backup cells can be defined. A manager software agent for a particular cell may be placed into contact with the manager software agent of another cell, by which information about the cells may be passed back and forth. Additionally, one of the software agents may be given administrative control over another software agent with which it is in communication.

20 Claims, 5 Drawing Sheets

U.S. PATENT DOCUMENTS

| | | | |
|---|---|---|---|
| 4,995,035 A * | 2/1991 | Cole et al. ................. 370/254 |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A * | 1/1994 | Kenley et al. ..................... 1/1 |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,455,926 A | 10/1995 | Keele et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,555,404 A | 9/1996 | Torbjornsen et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,835,953 A * | 11/1998 | Ohran ........................ 711/162 |
| 5,875,478 A | 2/1999 | Blumenau |
| 5,875,481 A | 2/1999 | Ashton et al. |
| 5,887,134 A | 3/1999 | Ebrahim |
| 5,901,327 A | 5/1999 | Ofek |
| 5,924,102 A | 7/1999 | Perks |
| 5,926,836 A | 7/1999 | Blumenau |
| 5,933,601 A | 8/1999 | Fanshier et al. |
| 5,950,205 A | 9/1999 | Aviani, Jr. |
| 5,958,005 A | 9/1999 | Thorne et al. |
| 5,974,563 A | 10/1999 | Beeler, Jr. |
| 6,000,020 A * | 12/1999 | Chin et al. ................. 711/162 |
| 6,021,415 A | 2/2000 | Cannon et al. |
| 6,026,414 A | 2/2000 | Anglin |
| 6,052,735 A | 4/2000 | Ulrich et al. |
| 6,070,228 A * | 5/2000 | Belknap et al. ............. 711/118 |
| 6,076,148 A | 6/2000 | Kedem et al. |
| 6,094,416 A | 7/2000 | Ying |
| 6,112,239 A | 8/2000 | Kenner et al. |
| 6,131,095 A | 10/2000 | Low et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,397,308 B1 | 5/2002 | Ofek et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,647,396 B2 | 11/2003 | Parnell et al. |
| 6,658,526 B2 | 12/2003 | Nguyen et al. |
| 6,728,733 B2 | 4/2004 | Tokui |
| 6,742,092 B1 | 5/2004 | Huebsch et al. |
| 6,757,794 B2 | 6/2004 | Cabrera et al. |
| 6,763,351 B1 | 7/2004 | Subramaniam et al. |
| 6,789,161 B1 | 9/2004 | Blendermann et al. |
| 6,871,163 B2 | 3/2005 | Hiller et al. |
| 6,886,020 B1 | 4/2005 | Zahavi et al. |
| 6,952,758 B2 | 10/2005 | Chron et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,983,351 B2 | 1/2006 | Gibble et al. |
| 7,003,519 B1 | 2/2006 | Biettron et al. |
| 7,062,761 B2 | 6/2006 | Slavin et al. |
| 7,082,441 B1 | 7/2006 | Zahavi et al. |
| 7,085,904 B2 | 8/2006 | Mizuno et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,107,395 B1 | 9/2006 | Ofek et al. |
| 7,120,757 B2 | 10/2006 | Tsuge |
| 7,155,465 B2 | 12/2006 | Lee et al. |
| 7,246,140 B2 | 7/2007 | Therrien et al. |
| 7,269,612 B2 | 9/2007 | Devarakonda et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,751 B2 | 3/2008 | Prahlad et al. |
| 7,359,917 B2 | 4/2008 | Winter et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,409,509 B2 | 8/2008 | Devassy et al. |
| 7,467,167 B2 | 12/2008 | Patterson |
| 7,472,238 B1 | 12/2008 | Gokhale |
| 7,490,207 B2 | 2/2009 | Amarendran |
| 7,500,053 B1 | 3/2009 | Kavuri et al. |
| 7,500,150 B2 | 3/2009 | Sharma et al. |
| 7,529,748 B2 | 5/2009 | Wen et al. |
| 7,536,291 B1 | 5/2009 | Retnamma et al. |
| 7,596,586 B2 | 9/2009 | Gokhale et al. |
| 7,613,748 B2 | 11/2009 | Brockway et al. |
| 7,627,598 B1 | 12/2009 | Burke |
| 7,627,617 B2 | 12/2009 | Kavuri et al. |
| 2002/0004883 A1 | 1/2002 | Nguyen et al. |

| | | |
|---|---|---|
| 2002/0040376 A1 | 4/2002 | Yamanaka et al. |
| 2002/0049778 A1 | 4/2002 | Bell et al. |
| 2002/0069324 A1 | 6/2002 | Gerasimov et al. |
| 2002/0103848 A1 | 8/2002 | Giacomini et al. |
| 2002/0107877 A1 | 8/2002 | Whiting et al. |
| 2003/0033308 A1 | 2/2003 | Patel et al. |
| 2003/0061491 A1 | 3/2003 | Jaskiewicz et al. |
| 2003/0225800 A1 | 12/2003 | Kavuri |
| 2004/0107199 A1 | 6/2004 | Dairymple et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2005/0033800 A1 | 2/2005 | Kavuri et al. |
| 2005/0086443 A1 | 4/2005 | Mizuno et al. |
| 2005/0131900 A1 | 6/2005 | Palliyll et al. |
| 2005/0268068 A1 | 12/2005 | Ignatius et al. |
| 2006/0005048 A1 | 1/2006 | Osaki et al. |
| 2006/0010227 A1 | 1/2006 | Atluri |
| 2007/0186042 A1 | 8/2007 | Kottomtharayil et al. |
| 2007/0288536 A1 | 12/2007 | Sen et al. |
| 2008/0016126 A1 | 1/2008 | Kottomtharayil et al. |
| 2008/0059515 A1 | 3/2008 | Fulton |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2009/0319534 A1 | 12/2009 | Gokhale |
| 2009/0319585 A1 | 12/2009 | Gokhale |
| 2010/0005259 A1 | 1/2010 | Prahlad |
| 2010/0131467 A1 | 5/2010 | Prahlad et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Dick Dixon; "Providing Mass Data storage and Retrieval Services in an Application-Specific Environment"; IEEE; 1993; pp. 25-30.*

Network Computing; "DCA'S Remote LAN Node"; Jul. 1, 1994; pp. 1 and 2.*

Moad, Jeff; "Your next LAN Storage could be a mainframe. (local area network) (includes related article on backup operations)"; Datamation, v39, n6; Mar. 15, 1993; pp. 1-5.*

David A. Anderson; "Mass Storage Archiving in Network Environments"; IEEE; 1988; pp. 45-49.*

Armstead et al., "Implementation of a Campus-wide Distributed Mass Storage Service: The Dream vs. Reality," *IEEE*, 1995, pp. 190-199.

Arneson, David A., Control Data Corporation, *Development of Omniserver*, Mass Storage Systems, 1990, pp. 88-93.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 12/695,289, filed Jan. 28, 2010, Prahlad et al.

Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.

http://en.wikipedia.org/wiki/Naive_Bayes_classifier.

PCT International Search Report and Written Opinion for International Application No. PCT/US07/81681, Mail Date Nov. 13, 2009, 8 pages.

* cited by examiner

HIERARCHICAL SYSTEMS AND METHODS FOR PERFORMING DATA STORAGE OPERATIONS

RELATED APPLICATIONS

This application is a continuation of U.S. patent application Ser. No. 09/354,058, entitled "HIERARCHICAL BACKUP AND RETRIEVAL SYSTEM," filed on Jul. 15, 1999, which is hereby incorporated herein by reference in its entirety.

This application is also related to U.S. patent application Ser. No. 09/354,063, entitled "MODULAR BACKUP AND RETRIEVAL SYSTEM", filed on Jul. 15, 1999, which is hereby incorporated herein by reference in its entirety.

BACKGROUND OF THE INVENTION

1. Field of the Invention

The present invention is directed to storage and retrieval systems. In particular, the invention is directed towards a hierarchical storage and retrieval system for a computer or a series of interconnected computers.

2. Description of Related Art

Conventional backup devices usually employ a monolithic backup and retrieval system servicing a single server with attached storage devices. These systems usually control all aspects of a data backup or retrieval, including timing the backup, directing the files to be backed up, directing the mode of the archival request, and directing the storage are not scalable and often direct only one type of backup and retrieval system, whether it is a network backup or a single machine backup.

If a backup software program failed for a particular computing device, a chance exists that the information for the backup suite would also be lost. Information about the activities of the backup program may be corrupted or lost. Additionally, without reinstallation, the backup program could not direct the backup of the particular computing device, and important information may not be backed up until the re-establishment of the backup program on the computing device.

Further, with distributed computing devices, it is necessary to micromanage each backup program on each computing device to maintain consistency in the backup activities of all backup programs. No external control can be asserted over multiple backup programs from a centralized location. Many other problems and disadvantages of the prior art will become apparent to one skilled in the art after comparing such prior art with the present invention as described herein.

SUMMARY OF THE INVENTION

Various aspects of the present invention may be found in a backup system for a network computing system. The network computer system has a first network device and a second network device. The backup system has a first software agent operating on a first network device on the network computing system. The first software agent is communicatively coupled to at least one backup device. The first software agent maintains operational parameters for the backup regime for the network computer system. The first software agent makes archival requests directed to the backup device or devices to initiate archival requests, including backups and restores.

A second software agent, operating on the second network device, supervises the operation of the first software agent. The second software agent is able to initiate archival function requests to the backup device or devices independent from the first software agent. Additionally, the second software agent may make an archival request directly to the first software agent, which then initiates the actual request directed to the backup device. The backup system of claim 1 wherein the first software agent is responsive to archival function requests from the second software agent. Or, the second software agent may change the operational parameters of the first software agent, thus allowing the second software agent to set administrative control of the backup of the network computing devices.

The first software agent communicates information on the status of the backup device or devices that it is responsible for to the second software agent. The first software agent may also communicate the status of the network computing devices that it is responsible for the backup of to the second software agent. This allows the second software agent to stand in for the first software agent when the first software agent is unable to perform at its full functionality. The second software agent is able to manage the backup of the network computing devices that the first software agent is responsible for when the first software agent is unable to do so.

In an exemplary embodiment, the network computer system has a first group of network computing devices. A manager software component runs on a network device and is responsible for managing parameters describing the archival characteristics of the first group of network devices, as well as able to initiate archival requests for those network computing devices.

The manager software component is communicatively coupled to at least one, possibly more, backup devices that physically perform the archival requests at the behest of instructions from the manager software component. A second software component supervises the manager software component, and is able to initiate a change in the operational parameters as described by the manager software component. Thus, the second software component may administer the characteristics of the backup policy of the manager software component.

In one embodiment, the second software component executes on a second network device, or it may also execute on the network device on which the manager component is executing. In an embodiment, the second software component is itself a manager software component responsible for the backup policies of a second group of network devices.

Or, the manager software component can operate the backup activities of a backup cell. Additionally, the second software component can operate the backup activities of a second backup cell, as well as manage or supervise the manager software component operating the first cell. Thus, a hierarchical structure in a backup system can be defined.

In another embodiment, the network computer system has a first group of network devices. The backup system has defined domains.

The first domain has a first manager software agent executing on a first network computing device. The first manager software agent is responsible for managing backup activities for the first group of network devices. The backup activities are coordinated with a backup device or devices that are in communication with the first manager software agent. These backup devices respond to the archival requests of the first manager software agent to carry out a backup policy for the first group of network devices.

A second domain has a second software agent, which administers the activities of the first manager software agent. The second software agent receives information on the first domain, and as such, the second software agent may operate the backup activities of the first domain.

The second software agent can manage a second group of network devices in the second domain in a similar manner to the first manager software agent operating and managing the first domain. As such, many other domains can be defined, and may be placed in communication with other domains. The manager software agent of each domain may be responsible for administratively managing other domains, and may in turn be managed by manager software agents in other domains. Many different control structures can be built with this interconnectivity of domains.

The information on a domain may be passed to another manager software agent responsible for another domain. The parent manager software agent may be able to pass instructions to the child domain and its manager software agent. As such, the parent manager software agent can operate the domain, or may be able to administer the child manager software agent's management of the domain.

Further, the second manager software agent may execute on the same network device as the first manager software agent. Alternatively, the second manager software agent may execute on a different network device as the first manager software agent.

Other aspects of the present invention will become apparent with further reference to the drawings and specification that follow.

DETAILED DESCRIPTION OF THE INVENTION

Figure 1:
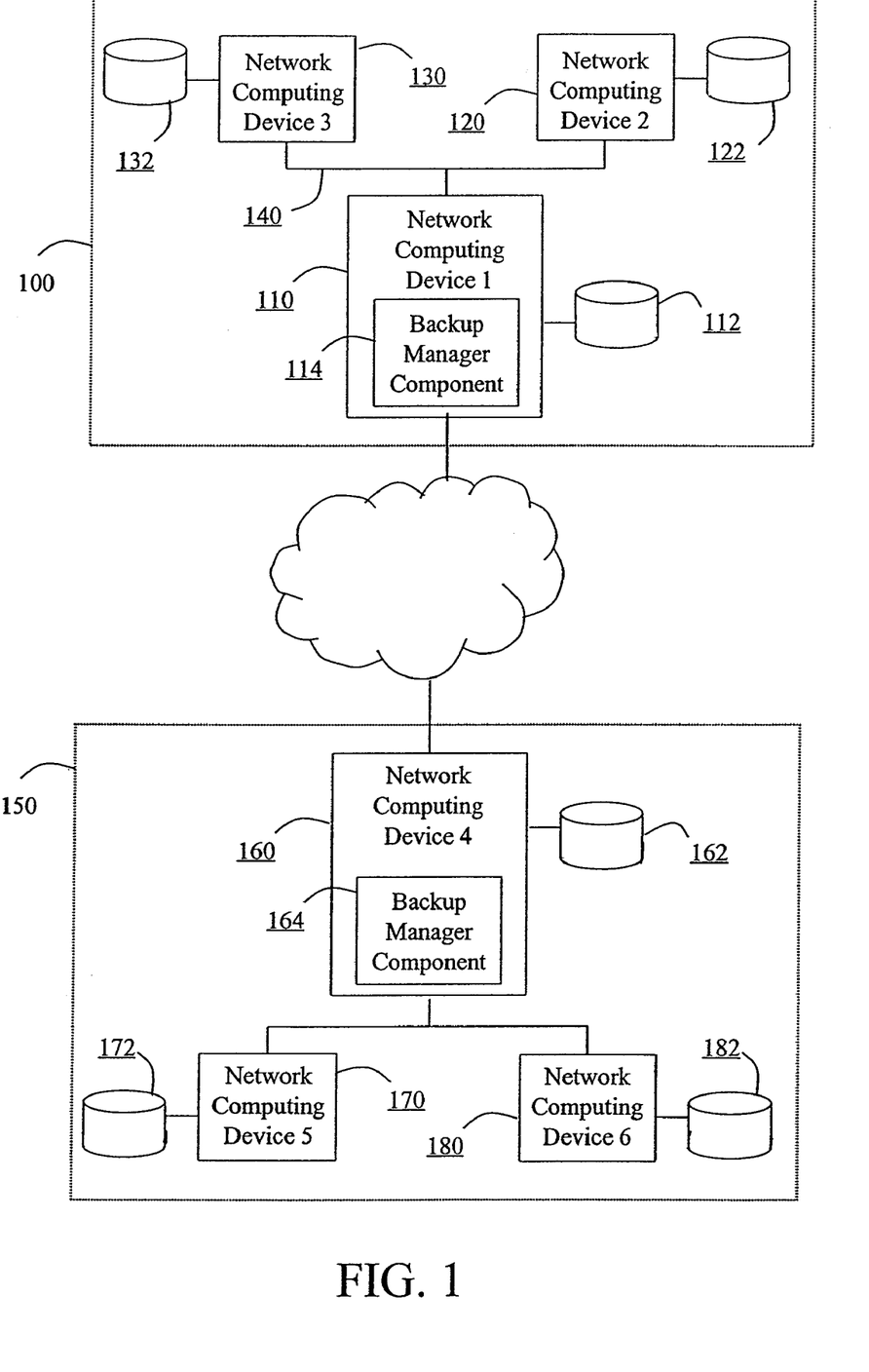
FIG. 1 is a block diagram of a hierarchical network backup system according to the invention.

FIG. 1 is a block diagram of a hierarchical network backup system according to the invention. A backup cell 100 comprises a plurality of network devices 110 (1), 120 (2), and 130 (3) that are to be backed up. The backups of the network devices are made to the attached backup devices 112, 122, and 132.

The network computing device 110 (1) contains a first manager component such as manager component 114. The first manager component 114 is a software agent responsible for maintaining backup parameters of the backups in the backup cell 100, and initiating a backup policy for the attached network computing devices according to those parameters. The parameters can include schedules of backups, aging policies, pruning policies, and backup media usage policies. Thus, through the operation of the first manager component 114, an administrator can define the characteristics of the backup actions for the network computing devices associated with the backup cell 100.

Connected to and in communication with the backup cell 100 is a backup cell 150, comprising a plurality of network devices 160 (4), 170 (5), and 180 (6). These network devices are also subject to backing up to the backup devices 162, 172, and 182.

The network computing device 160 (4) contains a second manager component such as manager component 164 that is responsible for the backup parameters of the backups in the backup cell 150. The second manager component 164 is similar in operation and in functionality to the first manager component 114 in the backup cell 100. Thus, through the operation of the second manager component 164, an administrator can define the characteristics of the backup actions for the backup cell 100.

In the case where the network 140 connecting the network devices 110 (1), 120 (2), and 130 (3) is not suitable based on speed and/or reliability, the size and scope of the backup cell 100 may be limited. Or, the site at which the backup cell 100 is physically located may not have an administrator present with the background, ability, or authority to modify the backup parameters of the backup cell 100. Or, having a single point of failure, namely the network device 110 (1) or the first manager component 114 may not be an acceptable alternative to the user of the backup cell 100.

As such, the second manager component 164 of the backup cell 150 is placed in communication with the backup cell 100. The second manager component 164 running on the network device 160 (4) is given the authority, power, and ability to maintain and control the backup parameters and actions on the backup cell 100. Further, information on the status of the network devices, the backup devices, and on the first manager component 114 is made known to the second manager component 164. Thus, the backup of the network devices 110 (1), 120 (2), and 130 (3) may be maintained and controlled from another software agent at another location, such as the second manager component 164. As such, alternative administration may be exercised on the backup characteristics and actions of the backup cell 100 from another backup cell.

Routine activities within the backup cell 100 can take place with little or no interaction with the second remote manager component 164. These routine activities include backups of and restorations to the network devices 110 (1), 120 (2), and 130 (3), and administration and/or configuration of the parameters of the archival functionality of the backup cell 100.

Alternatively, interaction with the second remote manager component 164 could take place when an administrator who is logged into the network device 160 (4) would like to administer activity that takes place in the backup cell 100. Or, splitting of administrative functionality between the first and second manager components 114 and 164 could take place, thus centralizing some or all of the definition of the functionality of the backup schemes to a common set of parameters across associated backup cells. Or, the administrative authority of the manager components may be highly decentralized, and the alternative control of another backup cell may be used only when the manager component of another backup has failed for some reason.

Information on the individual components making up the backup cell 100 can be communicated to the second manager component 164. Thus, the second manager component 164 could, to varying degrees as defined by operational needs, operate or initiate operation of the various components of the backup cell 100.

The second manager component 164 could also be configured to change the operational parameters of the manager component 150. Thus, a system wide change to backup cell parameters can be initiated through a single manager component and propagated to other backup cells. Or, the second manager component 164 could fill in for the first manager component 114 should it fail. Additionally, the interaction between the backup cells and other manager components allows for the appearance of a "seamless" network of backup cells to administrators sitting in remote locations.

Additional supervisory levels, controls, or permissions could be added to the second manager component 164 to allow the supervisory control of additional backup cells for which the first manager component 114 is supervising. As such, a hierarchy of backup control can be realized through the interaction of levels or connections of manager components.

Additionally, the first and second manager components 114 and 164 can be configured such that critical events are propagated to another manager component having supervisory control or permission for it. Thus, an administrator logged into a managerial component sitting in the path of propagation can see critical events happening in the backup cells in the path of supervision. This criticality threshold for an event to be propagated to another management component of another backup cell may be configurable. Thus, an individual manager component can track the universe of backup cells that it is communicatively coupled to.

It should be noted that while only one backup cell is pictured in communication with the second manager component 164, that any number of backup cells may be envisioned. It should also be noted that the hierarchy of backup cells may be configured in many manners. Thus, a single manager component may associate itself with several other backup cells, in a "shallow" configuration. Or, each succeeding manager component may be associated with one or more other backup cells, providing a tree-like structure to the supervisory capacities of the manager components. Or, a ring-like structure may be envisioned, where each manager component is associated with another backup cell, and the last manager component is associated with the first backup cell.

Further details on structures of a backup cell may also be envisioned by reference to U.S. patent application Ser. No. 09/354,063, entitled "MODULAR BACKUP AND RETRIEVAL SYSTEM", filed Jul. 15, 1999. This application is incorporated hereby by reference for all purposes. The details of the backup cell as recited in the reference are substantially similar to that outlined above, but are not detailed in this application.

Figure 2:
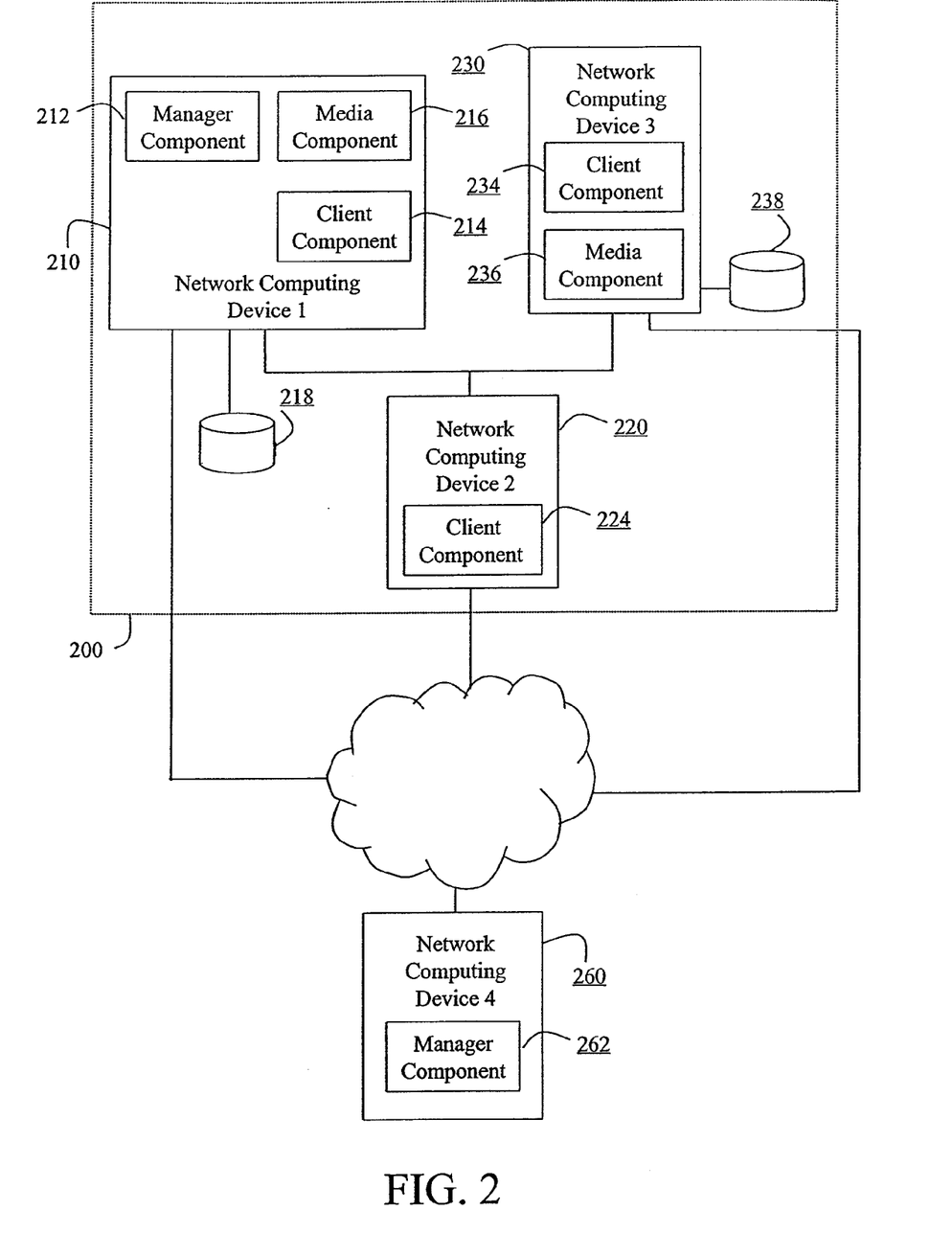
FIG. 2 is functional block diagram of an embodiment of the hierarchical backup system of FIG. 1 embodying data transfer between the components comprising the individual backup cell and the transfer of data outside of the backup cell.

FIG. 2 is functional block diagram of an embodiment of the hierarchical backup system of FIG. 1 embodying data transfer between the components comprising the individual backup cell and the transfer of data outside of the backup cell. The backup cell 200 comprises the network computing devices 210 (1), 220 (2), and 230 (3). The network computing device 210 (1) runs a first manager component such as first manager component 212, responsible for the backup parameters of the backup cell 200, as described before.

The network computing devices 210 (1) and 230 (3) are communicatively coupled to backup devices 218 and 238, respectively. The backup devices 218 and 238 store the data and or files directed to them in a backup, where the data and/or files can be retrieved at a later time.

The backup devices 218 and 238 are operated by media components 216 and 236, respectively. The media component 216 is a software agent responsible for the physical operation of the backup device 218 during a backup or restore. During a backup, the media component 216 maintains an index of the data units and/or files backed up and where they are physically located on the physical backup device 218. The backup device 238 and the media component 236 operate in a similar manner. It should be noted that the backup devices may be many types of devices, including such storage devices as tape drives, cartridge drives, magneto-optical drives, or any combination thereof.

The network computing devices 210 (1), 220 (2), and 230 (3) also contain client components 214, 224, and 234, respectively. The client components 214, 224, and 234 are software agents tasked with maintaining the operational parameters and controlling a backup or restore of an individual network computing device. Thus, the types of files and/or data backed up, the priority of the files and/or data to be backed up, and other operational parameters of a backup for a particular network computing device are controlled by a particular client component.

In a backup, the first manager component 212 would indicate to the appropriate client component to initiate a backup, and that the backup should be directed to a particular backup media. For example, assume that the first manager component 212 determines that a backup of the network device 220 (2) is warranted. The first manager component 212 also determines that the backup should be directed to the backup device 238. The first manager component 212 would contact the client component 224 with the request for a backup of the network device 220 (2), and that the data and/or files should be stored through the media component 236 on the backup device 238.

The client component 224 undertakes the backup of the network computing device 220 (2) in an appropriate manner. The backup may be a full backup, an incremental backup, or a differential backup, depending upon the strategy as defined by an administrator for the network computing device 220 (2). The client component 224 would then notify the media component 236 of the data and/or files to be backed up. The media component 236 would cause the data and/or files sent by the client component 224 to be physically backed up on the backup device 238.

The media component 236 makes an index entry for the backed up file and/or data units, thus keeping an easily maintained and coordinated way to manage information on the backup of the file and/or data units, including their whereabouts and other particulars. Portions of the indexed information on the file and/or data units are forwarded to the first manager component 212. The manager component may use this information in the managing of the backup devices and the determination of where to send other file and or data units from backups from other network computing devices.

The first manager component 212 is able to receive and send this indexed information to the second manager component such as second manager component 262 running on the network computing device 260 (4). Additional indexed information on the backup can exist distributed about the various media components, and the first or second manager components 212 or 262 can access this information by querying the proper media component for it. Thus, the information required to make the proper query can be passed among the manager components as well. The second manager component 262 can itself be a manager component for the backup cell where it resides.

While a peer-to-peer relationship can be present among the manager components, the manager components can be configured in a parent-child relationship as well. The first manager component 212 can be configured to receive directions from the second manager component 262 regarding the operation of the backup cell 200. Additionally, information on the client components 214, 224, and 234 could be provided, as well as information on the media components 216 and 236, and on the backup devices 218 and 238.

Should the second manager component 262 running on the network computing device 260 (4) be so configured, this information from the first manager component 212 could be propagated to the second manager component 262. Thus, complete operational control of the first manager component 212 could be asserted from the second manager component 262 with the proper authorization.

Further, since the second manager component 262 has information about the client components 214, 224, and 234, the information about the media components 216 and 236, as well as information about the media devices 218 and 238, the second manager component 262 could operate as a surrogate manager component to the backup cell 200. As such, the first manager component 212 could be bypassed in the event of a failure of the first manager component 212.

Additionally, the second manager component 262 may be given a supervisory control over the first manager component 212. This would enable the second manager component 262 to change operational parameters, administration, or configuration of the backup cell 200, or to allow a supervisor sitting at the network device 260 (4) to operate the functionality of the backup cell 200 in the event of an emergency.

Figure 3:
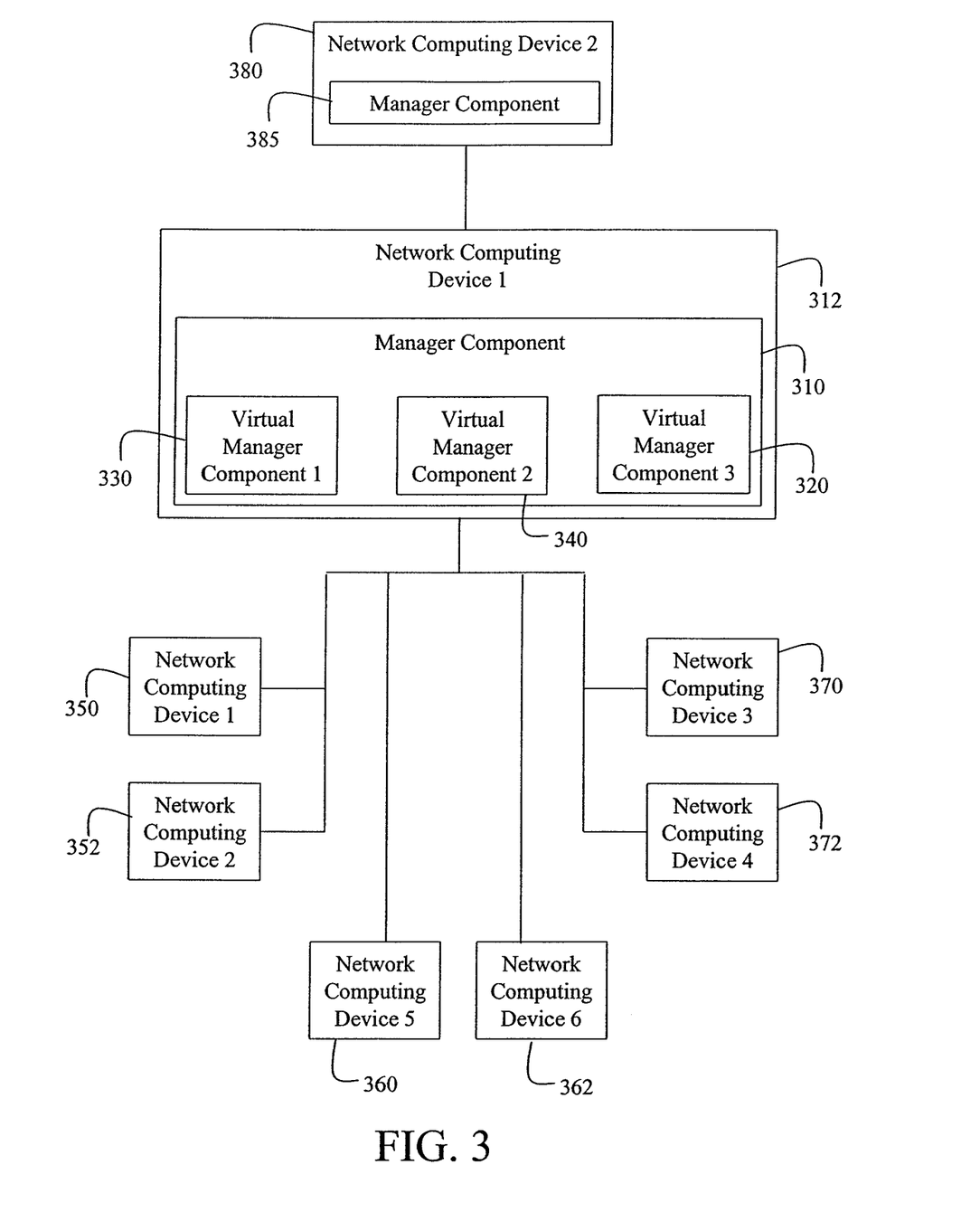
FIG. 3 is a block diagram detailing the use of the manager component of FIG. 1 as a virtual manager component for a plurality of virtual backup cells.

FIG. 3 is a block diagram detailing the use of the manager component of FIG. 1 as a virtual manager component for a plurality of virtual backup cells. The backup cells 100 and 150 of FIG. 1 may be "virtual", as well as physical, backup cells. The virtual manager components can identify administrative domains over which the particular virtual manager component exercises administrative control.

In this case, one physical manager component such as first manager component 310 could be logically divided into several virtual manager components 320 (3), 330 (1), and 340 (2). Each of the virtual manager components 320 (3), 330 (1), and 340 (2) would be responsible for the backup functionality of portions of the physical network devices located in the physical backup cell.

The first manager component 310 runs on a network computing device 312. Connected to and in communication with the network computing device 312 are network computing devices 370 (3), 372 (4), 350 (1), 352 (2), 360 (5), and 362 (6).

The network computing devices 370 (3) and 372 (4) are logically grouped together as a unit requiring one particular set of backup guidelines. Similarly, the network computing devices 350 (1) and 352 (2) are logically grouped together as another group of network computing devices requiring another particular set of backup guidelines. Also, the network computing devices 360 (5) and 362 (6) are logically grouped together as a unit requiring yet another particular set of backup guidelines.

The first manager component 310 can be configured to operate three independent backup management policies. The virtual manager component 340 (2) is responsible for the backup management of the group of network devices 370 (3) and 372 (4). The virtual manager component 320 (3) is responsible for the backup management of the group of network devices 350 (1) and 352 (2). The virtual manager component 330 (1) is responsible for the backup management of the group of network devices 360 (5) and 362 (6).

A remote network computing device 380 operates a second manager component such as manager component 385. The second manager component 385 is in communication with the first manager component 310. As such, the first manager component 310 can be configured to supervise the activities of the manager component 310, and the virtual manager components 320 (3), 330 (1), and 340 (2).

Figure 4:
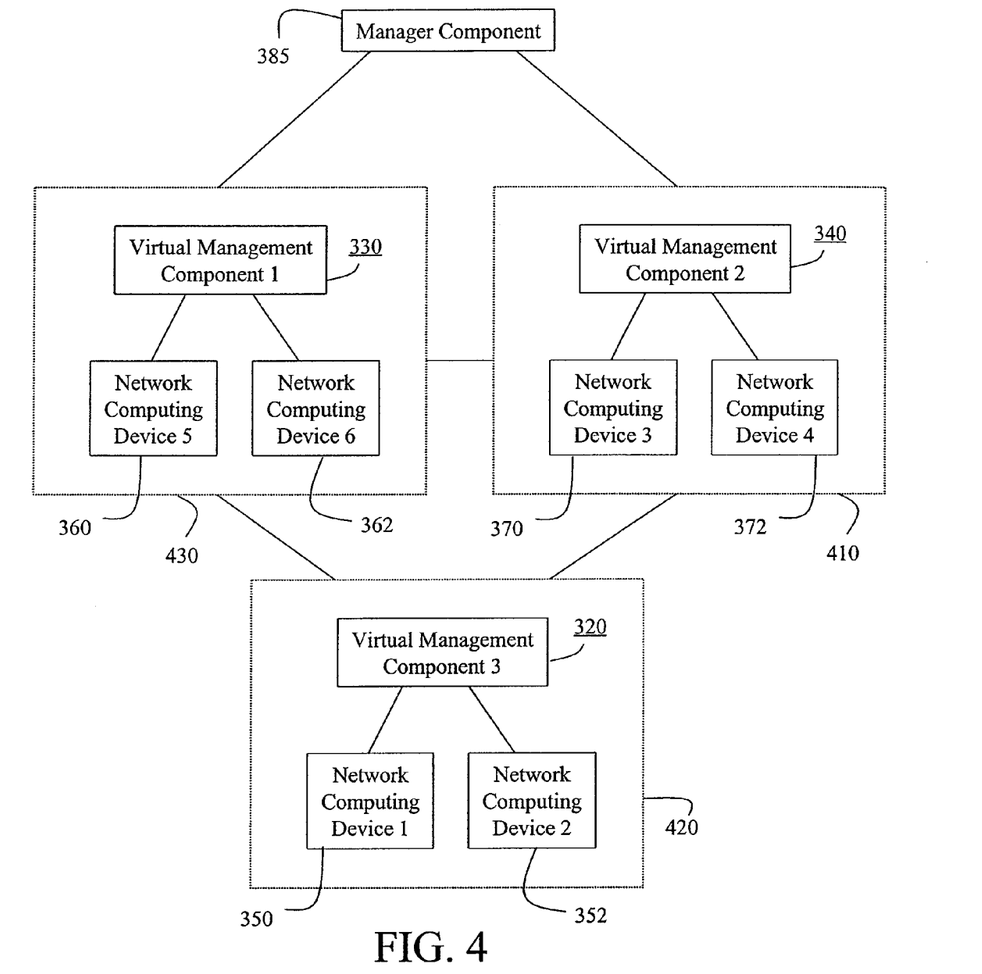
FIG. 4 is a logical block diagram of the resulting backup cells of the network system depicted in FIG. 3.

FIG. 4 is a logical block diagram of the resulting backup cells of the network system depicted in FIG. 3. The manager component 340 and the network computing devices 370 (3) and 372 (4) make up a first virtual backup cell 410. Similarly, the manager component 320 (3), along with the network computing devices 350 (1) and 352 (2), make up a second virtual backup cell 420. Also, the manager component 330 (1) and the network computing devices 360 (5) and 362 (6) make up a third virtual backup cell 430.

Each virtual manager component is responsible and maintains the functional parameters associated with the group of network computing devices associated with it. Each virtual manager component within the physical first manager component 310 (depicted in FIG. 3) is able to maintain and control the backup and restoration actions and parameters of the network devices associated with it in a manner independent from the other virtual manager components it is related to.

The virtual manager components may be configured where one of the manager components maintains supervisory control over the others, or any other combination. Or, the remote second manager component 385 may maintain supervisory control any of the virtual manager components 320 (3), 330 (1), and 340 (2) and their associated backup cells. Or, as indicated earlier, any or all of the virtual manager components 320 (3), 330 (1), and 340 (2) may be configured to supervise the second manager component 385 and its associated backup cell.

As such, the ability to link together similar network devices under different manager components enables a backup system that easily defines domains and sub-domains within an enterprise or organization. Thus, a manager component able to maintain supervisory control over others may be easily maintained and identified in a linked network of virtual and physical backup cells by name.

Figure 5:
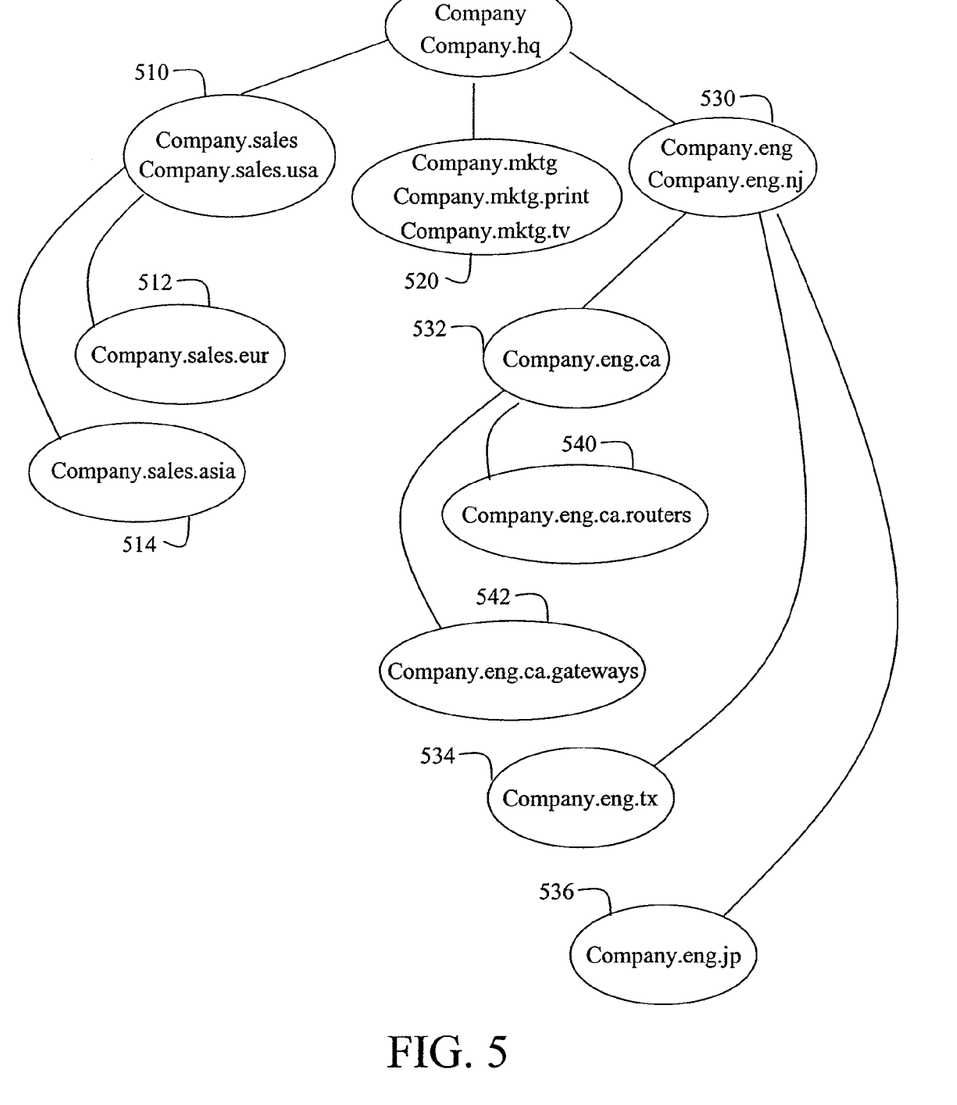
FIG. 5 is a block diagram of an exemplary hierarchical backup network according to the invention.

FIG. 5 is a block diagram of an exemplary hierarchical backup network according to the invention. Each bubble represents a physical backup cell, as described previously. The physical backup cells may contain other virtual backup cells. The backup cells can be configurable by a domain name, which uniquely identifies the location and/or supervisory overview of the backup cell in the hierarchy.

As such, the root backup cell of the network of backup cells can be defined as the domain name "Company", or other identifier indicating the root. In the naming convention, any manager component associated with a particular name would exercise supervisory control over manager components having that name followed by a delimiter, and followed by a sub-domain name. In this case, the manager component within a backup cell that is the root of a sub-tree would be able to exercise supervisory or administrative control over the backup cells further from the root.

Thus, the manager component associated with the "Company" backup cell would exercise supervisory control over the entire tree, including the sub-domains indicated by "Company.hq", "Company.mktg", "Company.eng", and "Company.sales". Additionally, the manager components under each of the sub-domains would exercise supervisory control over the sub-sub-domains identified with the proper sub-domain prefix.

As such, the domain "Company.hq" may be representative of an administrative domain located at a company's headquarters and responsible for backup actions and parameters about the physical headquarters. The managerial component associated with the domain "Company" can exercise supervisory control over the backup cell associated with the domain "Company.hq".

A backup cell 510 is a backup cell associated with the sales network computing devices. The backup cell 510 contains two different domains, "Company.sales" and "Company.sales.usa". The domain "Company.sales" is the supervisory domain for the sub-domains existing underneath "Company.sales". The domain "Company.sales.usa" is associated with a backup cell that manages the backups for network computing devices in the company's United States sales area. The manager component directing the backup cell "Company.sales.usa" is supervised by the manager component associated with the backup cell "Company.sales"

A backup cell 512 is associated with the network devices involved in the company's sales in Europe. The backup cell 512 is communicatively coupled to the backup cell 510, and is given the domain name "Company.sales.eur". As such, the manager component associated with the backup cell 512 is under the supervisory control of the manager component associated with the domain "Company.sales".

Correspondingly, the backup cell 514 is concerned with directing backups of network computing devices involved in the Asian sales division. The backup cell 514 is communicatively coupled to the backup cell 510, and has the domain name "Company.sales.asia". Thus, the manager component for the backup cell 514 is under the supervisory control of the manager component associated with the domain name "Company.sales".

One should note that in this example the manager components for the backup cell 512 do not have supervisory control over the backup cell 514, and vice versa. In any case, this is possible and can be implemented.

The backup cell 520 contains several hierarchical portions. First, the domain "Company.mktg" is contained in the backup cell 520. The manager component associated with the "Company.mktg" domain exercise supervisory functions for backup cells residing under the "Company.mktg" domain. These other sub-domains are administered and configured from the manager component associated with the "Company.mktg" domain.

Additionally, the backup cell 520 contains the virtual backup cells "Company.mktg.ty" and "Company.mktg.print", each associated with the backup of network devices associated with the different departments in the "Company.mktg" domain. Each domain has its own virtual manager component exercising control over its own particular administrative domain, and being under the supervisory control of a manager component running on the same backup cell 520.

A backup cell 530 contains a domain named "Company.eng", responsible for supervisory control of the backup schemes for the network devices in the company's engineering locations. The backup cell 530 also contains a domain "Company.eng.nj". The manager component associated with the domain "Company.eng.nj" is responsible for the configuration, administration, and direction of backups of network computing devices for engineering work located in the company's New Jersey locations.

Nested underneath the backup cell 530 are backup cells 532, 534, and 536, having the domain names "Company.eng.ca", "Company.eng.tx", and "Company.eng.jp", respectively. Each of these backup cells is responsible for the backup of network computing devices at a particular location, and is under the supervisory control of the manager component associated with the domain "Company.eng".

Additionally, other backup cells 540 and 542 are nested beneath the domain "Company.eng.ca". The domains "Company.eng.ca.routers" and "Company.eng.ca.gateways" are associated with backup cells for network computing devices associated with specific lines of engineering.

Thus, from the manager component associated with the domain "Company", an administrator can configure, administer, or direct backup activities for any of the nested backup cells below it in the "hq", "sales", "mktg", or "eng" domains. Sufficient information on backups and events are replicated up from the lower lying backup cells in the tree to allow the manager component associated with the "Company" domain to perform these supervisory duties. Further, any intervening manager components in the path between a specific domain and the root may perform the supervisory activities.

Thus, from any backup cell on a sub-tree, a manager component associated with that backup cell can supervise, configure, or administer the backup functionality of any backup cell in nested below it. For example, and administrator at the "Company.eng" manager component would be able to configure all the backup cells in with the name "Company.eng.*", where "*" stands for any sub-domain under the "Company.eng" domain.

Critical events or information regarding a physical backup in a backup cell, such as the information indexed by a media component as it backs up a file and/or data unit, are communicated towards the root. For example, assume that a particular network computing device operating in the backup cell "Company.eng.ca.gateways" fails. If the event is critical enough, news of the event would be replicated to "Company.eng.ca", and from there to "Company.eng", and ultimately to "Company". Thus, actions at any of these backup cells may be asserted to aid the situation. Information regarding the backup process would also be replicated towards the root.

Usually, the events are replicated in an online fashion in real-time. Replication takes place, subject to criticality thresholds, all the way to the root as long as the parent backup cell is reachable. If the parent is unreachable, the underlying backup cell needing to send the information on may periodically spawn a process to check on the reachability of the parent backup cell. If the parent backup cell resumes a reachable state, the message, along with others stored in a queue, are passed upwards to the parent backup cell.

Or, the parent may request a "dump" of meta-data and critical events regarding the status of the system and its children at any time. This dump may be a one level dump, or may recursively act on all the sub-domains of the sub-domain. This meta-data could include the information regarding the backup event and indexed at the time of backup, information of all domains known to the child backup cell, backup devices and their associated media components in the backup cell, clients and their client components in the backup cell, applications running on the client network devices in the backup cell, related archive files grouped into archive groups on the network devices in the backup cell, sets of related media defining a media group in the backup cell, and all backup devices.

Thus, not only events may be passed upwards, but the state of each backup cell, both physical and virtual, may be passed upwards accordingly. This allows the parent manager component to act in place of the child should it be required to do so. Or, it allows true supervisory control of the child backup cell, as well as the supervisory control over any child backup cells of the child backup cell, and so on.

Additionally, due to the passage of this information, viewing, administering, configuring, and controlling the domains under a particular domain is possible from a root domain. Further, the manager components associated with the sub-domains may be administered from the root domain of the tree or any sub-tree within the main body of the tree structure. Thus, administration en masse is possible for an entire enterprise, division, location, or any other granularity as required. In view of the above detailed description of the present invention and associated drawings, other modifications and variations will now become apparent to those skilled in the art. It should also be apparent that such other modifications and variations may be effected without departing from the spirit and scope of the present invention as set forth in this specification.

What is claimed is:

1. A hierarchical storage management system for storing data in a network environment, the storage management system comprising:
   a plurality of backup cells, each of the plurality of backup cells being coupled to another of the plurality of backup cells, and wherein at least one of the plurality of backup cells further comprises:
      a media component configured to execute on a first network computing device of a plurality of network computing devices and being communicatively coupled to at least one storage device to store data to the at least one storage device,
      a client component configured to execute on a second network computing device of the plurality of network computing devices and to obtain the data from at least one of the plurality of network computing devices according to first parameters maintained by the client component, the client component being further configured to transmit the data to the media component, and
      a first manager component configured to execute on a third network computing device of the plurality of network computing devices and to direct the client component to obtain the data according to second parameters maintained by the first manager component; and
   a second manager component of at least one other of the plurality of backup cells, wherein the second manager component is configured to control the first manager component of the at least one backup cell of the plurality of backup cells.

2. The storage management system of claim 1, wherein the media component further comprises an index of the physical location of the data stored on the at least one storage device.

3. The storage management system of claim 2, wherein the media component is configured to send at least a portion of the index to the first manager component.

4. The storage management system of claim 3, wherein the first manager component is configured to send the portion of the index to the second manager component.

5. The storage management system of claim 1, wherein the second manager component is configured to execute on a fourth network computing device.

6. The storage management system of claim 5, wherein the second manager component is configured to independently and directly control storage operations to the at least one storage device.

7. The storage management system of claim 5, wherein the second manager component is configured to control storage operations via the first manager component.

8. The storage management system of claim 1, wherein the second manager component is configured to maintain information regarding an operational status of at least one of the first manager component, the at least one storage device and the media component.

9. The storage management system of claim 1, wherein at least one of the plurality of backup cells further comprises the at least one storage device.

10. The storage management system of claim 1, wherein the at least one other of the plurality of backup cells further comprises:
   a second media component configured to execute on a fourth network computing device of the plurality of network computing devices and being communicatively coupled to a second storage device to store second data to the second storage device;
   a second client component configured to execute on a fifth network computing device of the plurality of network computing devices and to obtain and transmit the second data to the second media component; and
   wherein the at least one other of the plurality of backup cells is configured to be controlled by a third manager component of a third backup cell of the plurality of backup cells.

11. The storage management system of claim 1, further comprising a second backup cell of the plurality of backup cells, wherein the second backup cell further comprises:
   a second media component configured to execute on a fourth network computing device of the plurality of network computing devices and being communicatively coupled to a second storage device to store second data to the second storage device;
   a second client component configured to execute on a fifth network computing device of the plurality of network computing devices and to obtain and transmit the second data to the second media component; and
   a third manager component configured to execute on a sixth network computing device of the plurality of network computing devices and to direct the second client component to obtain the second data according to third parameters maintained by the third manager component, and wherein the second manager component of the at least one other of the plurality of backup cells is configured to control the third manager component of the second backup cell.

12. The system of claim 1, wherein the second parameters include at least one of a storage schedule, an aging policy and a pruning policy.

13. A method for performing a storage operation in a hierarchical storage management system, the method comprising:
   receiving a request to perform a storage operation on data stored on a first client device;
   instructing, with a first manager component of a first network device, a second manager component of a second network device to initiate the storage operation;
   obtaining the data from the first client device with a client component configured to execute on the first client device;
   storing the data to a storage device with a media component of a third network device according to parameters maintained by the first manager component;
   updating an index maintained by the media component, the index indicating a physical location of the data stored on the storage device; and
   forwarding at least a portion of the index to the first manager component, wherein the first manager component is part of a first backup cell hierarchically coupled to a second backup cell comprising the second manager component, the client component and the media component.

14. The method of claim 13, additionally comprising initiating the request to perform the storage operation based at least on an aging policy.

15. The method of claim 13, additionally comprising alerting the first manager component with respect to operation of the second backup cell.

16. The method of claim 13, wherein said receiving is performed by the first manager component.

17. The method of claim 13, additionally comprising receiving with the first manager component status information regarding the second manager component and a third manager component of a third backup cell hierarchically coupled to the first backup cell.

18. The method of claim 17, wherein said instructing the second manager component to initiate the storage operation further comprises selecting the second manager component based on an availability of the second manager component and the third manager component.

19. A hierarchical storage management system, the system comprising:

a first backup cell comprising:
   a first manager component communicatively coupled to at least one storage device and configured to control storage of data from a first client device to the at least one storage device; and
a second backup cell communicatively coupled to the first backup cell, the second backup cell comprising a second manager component configured to (i) directly and independently control the storage of the data to the at least one storage device of the first backup cell and (ii) alternatively, instruct the first manager component of the first backup cell to control the storage of the data to the at least one storage device.

20. The system of claim 19, wherein each of the first and second manager components maintains an index of a physical location of the data stored on the at least one storage device.

* * * * *